US009307513B2

(12) United States Patent
Yang et al.

(10) Patent No.: US 9,307,513 B2
(45) Date of Patent: Apr. 5, 2016

(54) METHOD OF SUPPORTING MULTI-HOMING IN A UBIQUITOUS SENSOR NETWORK

(71) Applicant: Alcatel Lucent, Paris (FR)

(72) Inventors: Shuigen Yang, Shanghai (CN); Jun Zheng, Shanghai (CN); Fanxiang Bin, Shanghai (CN); Haibo Wen, Shanghai (CN); Chunyan Yao, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/360,019

(22) PCT Filed: Nov. 16, 2012

(86) PCT No.: PCT/IB2012/002683
§ 371 (c)(1),
(2) Date: May 22, 2014

(87) PCT Pub. No.: WO2013/076575
PCT Pub. Date: May 30, 2013

(65) Prior Publication Data
US 2014/0315544 A1    Oct. 23, 2014

(30) Foreign Application Priority Data
Nov. 25, 2011   (CN) .......................... 2011 1 0382738

(51) Int. Cl.
*H04W 60/00*        (2009.01)
*H04W 36/00*        (2009.01)
(Continued)

(52) U.S. Cl.
CPC ........ *H04W 60/005* (2013.01); *H04W 36/0011* (2013.01); *H04W 36/0027* (2013.01); *H04W 80/04* (2013.01); *H04W 88/06* (2013.01)

(58) Field of Classification Search
CPC .......... H04W 60/005; H04W 36/0011; H04W 36/0027; H04W 88/06; H04W 80/04
See application file for complete search history.

(56) References Cited

U.S. PATENT DOCUMENTS 7,649,888 B2 *   1/2010   Kaippallimalil .............. 370/392
8,477,729 B2 *   7/2013   Muhanna et al. ............. 370/331
(Continued)

FOREIGN PATENT DOCUMENTS

| CN | 101822005 A | 9/2010 |
| CN | 102123526 A | 7/2011 |
| WO | 2010/022374 A1 | 2/2010 |

OTHER PUBLICATIONS

International Search Report for PCT/IB2012/002683 dated Apr. 23, 2013.

*Primary Examiner* — Brandon Miller
(74) *Attorney, Agent, or Firm* — Fay Sharpe LLP

(57) ABSTRACT

Method of Supporting Multi-homing in a Ubiquitous Sensor Network The present invention provides a method for supporting multi-homing in a ubiquitous sensor network. In the method, a sensor network gateway sends a configuration request to a sensor network controller, the configuration request being for querying whether a sensor network governed by the sensor network gateway supports multi-homing; then, the sensor network gateway receives a configuration file from the sensor network controller, the configuration file being for indicating whether the sensor network supports multi-homing; when the sensor network supports multi-homing, a binding update message is sent to the sensor network controller, wherein the binding update message comprises an identifier of the sensor network and an indicator for indicating that the sensor network supports multi-homing. By adopting the solution of the present invention, the sensor node or sensor network is enabled to simultaneously access to the Internet in a multi-interface manner.

8 Claims, 3 Drawing Sheets

(51) Int. Cl.
*H04W 88/06* (2009.01)
*H04W 80/04* (2009.01)

(56) References Cited

U.S. PATENT DOCUMENTS

| | | | |
|---|---|---|---|
| 8,824,352 B2* | 9/2014 | Yan et al. | 370/313 |
| 2008/0259848 A1* | 10/2008 | Aso et al. | 370/328 |
| 2010/0208742 A1* | 8/2010 | Kafle et al. | 370/401 |
| 2010/0303031 A1 | 12/2010 | Rune | |
| 2011/0116550 A1* | 5/2011 | Lee et al. | 375/240.25 |
| 2012/0179803 A1* | 7/2012 | Melia et al. | 709/223 |
| 2013/0058275 A1* | 3/2013 | Melia et al. | 370/328 |
| 2013/0086142 A1* | 4/2013 | Hampel et al. | 709/203 |

* cited by examiner

| Sensor network node | Interface address | SGW address | Binding identifier | Tag | Stream tag |
|---|---|---|---|---|---|
| SID1 | Etho1 | SGW1 | BID1 | M | FID1 |
| | Etho2 | SGW2 | BID2 | S | FID2 |
| SID2 | Etho3 | SGW3 | BID3 | M | FID3 |
| ... ... | ... ... | ... ... | ... ... | ... ... | ... ... |

| | | | | | | | | Serial number |
|A|H|L|K|M|R|P|Mu|Reserved| Survival time |

| Mobile option 1 (sensor network identifier) |
| Mobile option 2 (HI=1) |

Fig.4

| | State | K | R | P | Mu | Reserved |
| Serial number | Survival time |
| Mobile option (HI=1) |

Fig.5

METHOD OF SUPPORTING MULTI-HOMING IN A UBIQUITOUS SENSOR NETWORK

TECHNICAL FIELD

The present invention relates to a ubiquitous sensor network, and more specifically, to a method of supporting multi-homing in the ubiquitous sensor network.

BACKGROUND

As a comprehensive intelligent information system that integrates wireless technology, embedded technology, and sensor network technology, a sensor network may be applied in various fields such as public security, ecology and environment, emergency management, intelligent transport, anti-terrorism, intelligent home, etc. For example, a sensor/controller network in intelligent home, collection of various parameters in an industrial site, and uniform networking regulation of controllers, etc., can be implemented through a sensor network.

In the existing ubiquitous sensor network (USN) scenario, the number of sensor nodes or sensor networks, as well as the number of sensor application users, is huge. With the increase of the number of sensor nodes or sensor networks and the number of sensor application users, a single access node in the Internet for accessing sensor networks into the Internet has a too heavy load, such that the sensor nodes or sensor networks and the sensor application users are affected by a delay caused by queuing at the access node, thereby increasing an end-to-end delay. Besides, a sensor node or sensor network will support more and more applications. Some of these sensor applications have a high QoS requirement. For example, QoS of a medical care system requires that packets should not be lost; therefore, it is suitable to run in a 3GPP access system; while other applications, for example, transfer of weather forecast data, they are insensitive to packet loss and therefore suitable for running in other complementary access systems, for example a WiFi access network.

The existing multi-homing and load balance solutions for mobile nodes comprises adopting a proxy mobile IPv6 (Proxy Mobile IPv6, PMIPv6) technology.

In the traditional PMIPv6 multi-homing technology, when a new mobile access gateway (MAG) is newly associated via a new interface, the new MAG sends a proxy binding update message to a local mobility anchor LMA to register a new care-of-address. In the proxy binding update message, the new MAG sets an access technology (for example, adopting a WiFi access technology or a 3G access technology, etc.) and a handoff indicator HI value. If the type of the access technology is different from the corresponding value of the node in current binding cache entry and the HI value is 2, the LMA determines that a handoff occurs between different access technologies. The LMA then sends as a response a proxy binding confirmation message to the MAG, in which confirmation message, HI is set as 2.

The following problems would arise if a traditional PMIPv6 multi-homing technology is used in a large scale ubiquitous sensor network:

In the traditional PMIPv6 multi-homing technology, the HI value must be set as 2. However, in real application, when a new interface is activated and accessed to a new MAG, the new MAG generally sets the HI value to 1 so as to indicate association to the new interface, instead of setting the HI value to 2.

In the traditional PMIPv6 multi-homing technology, the new MAG sets an HI value in a proxy binding update message that is sent to the LMA. It means that terminal node needs to notify the new MAG that the terminal node is a multi-homing node. However, in a USN environment, because a sensor node generally has a low energy and a poor processing capability, such sensor node will not tell the new MAG whether the present node is a multi-homing node. Thus, the new MAG should determine in other way whether the node is a multi-homing node.

Besides, it is easy for an MAG and an LMA which support a single access technology to correctly set the type of the access technology. However, in a USN environment, the sensor node or sensor network might access to the Internet through different access technologies. In other words, the MAG and the LMA may have different access technologies. In a scenario of multiple access technologies, it is hard to correctly set the access technology.

SUMMARY OF THE INVENTION

In order to solve the above technical problems, it may be advantageous to provide a method such that a sensor node or sensor network may access to the Internet in a multi-interface manner (this technology is called multi-homing). Considering that a sensor node generally has a relatively low power and a poor processing capability, the present invention provides a network-based ubiquitous sensor network multi-homing method.

According to a first aspect of the present invention, there is provided a method of supporting sensor network multi-homing in a sensor network gateway, comprising the following steps: sending a configuration request to a sensor network controller, the configuration request being for querying whether a sensor network governed by the sensor network gateway supports multi-homing; receiving a configuration file from the sensor network controller, the configuration file being for indicating whether the sensor network supports multi-homing; when the sensor network supporting multi-homing, sending a binding update message to the sensor network controller, wherein the binding update message comprises an identifier of the sensor network and an indicator for indicating that the sensor network supports multi-homing.

According to a second aspect of the present invention, there is provided a method for processing location information of a sensor network in a sensor network controller, comprising the following steps: receiving a configuration request from a sensor network gateway; querying a pre-configured local database based on the configuration request so as to determine whether the sensor network supports multi-homing; sending a configuration file to the sensor network gateway, the configuration file being for indicating whether the sensor network supports multi-homing.

By adopting the solution of the present invention, the selectable network resources in the access network are integrated, which therefore enhances the scalability; parameters such as cost, security, QoS (Quality of Service) are matched between a single sensor network data steam and an access network link; further, the solution of the present application realizes lossless handoff; thereby improving the reliability.

BRIEF DESCRIPTION OF THE ACCOMPANYING DRAWINGS

Through reading the following detailed description on the non-limiting embodiments with reference to the accompanying drawings, the other features, objectives, and advantages of the present invention will become more apparent.

FIG. 4 shows an exemplary format of a binding update message according to one embodiment of the present invention;

FIG. 5 shows an exemplary format of a binding confirmation message according to one embodiment of the present invention;

Wherein, like or similar reference numerals indicate same or corresponding step features or means/modules.

DETAILED DESCRIPTION OF THE INVENTION

Hereinafter, first, main technical terms in the present invention will be explained. Sensor network: in the context of the present invention, it comprises a sensor network and a sensor network node.

Multi-homing: a sensor network can access to the Internet in multiple manners, and such multi-access manner is called multi-homing.

Figure 1:
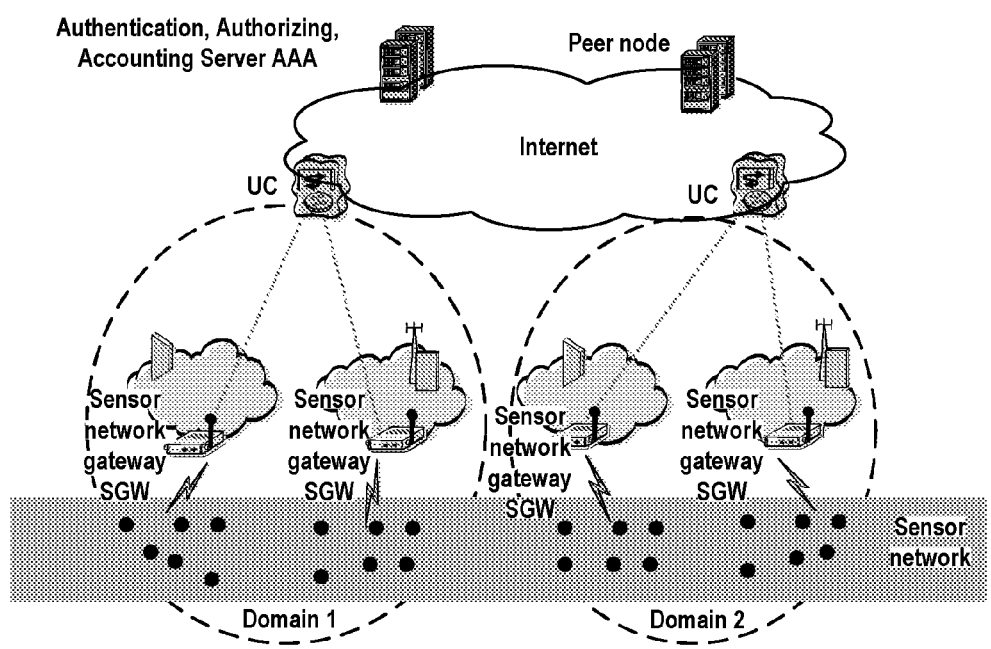
FIG. 1 shows a network topological structure diagram according to one embodiment of the present invention.

Network Architecture:

FIG. 1 shows a network topological structure diagram according to one embodiment of the present invention. The whole network is divided into a plurality of domains, each domain being called a UC domain. Each domain has a concentrated coordinator, i.e., a ubiquitous sensor network controller (UC). The sensor network controller forwards a data packet from or destined to its domain.

The architecture in FIG. 1 comprises the following main entities:

A sensor network gateway (SGW): located in the Internet and responsible for connecting a sensor network to the Internet. The SGW periodically sends a beacon comprising a Personal Area Network Identifier (PAN_ID) and an Extended Unique Identifier (EUI) of the SGW. Each SGW has a unique PAN Identifier in the network. If a sensor network receives the beacon, the sensor network queries the PAN_ID sent from the SGW and determines whether the sensor network is connected to a new SGW.

A sensor network controller (Ubiquitous Sensor Network Controller, UC): the sensor network controller is a coordinator, responsible for managing the sensor network and the sensor network gateway in the UC domain. The UC further forwards the data packet from or destined to its domain. Besides, the UC further creates a binding cache entry for the sensor network.

Hereinafter, the process of establishing a binding cache entry by the UC will be explained.

Sensor Network Controller Establishes a Binding Cache Entry

When a sensor network newly registers within the Internet, the sensor network needs to register through a sensor network gateway. The sensor network first sends a registration request to the sensor network gateway, wherein the registration request comprises an identifier of the sensor network.

Then, the sensor network gateway sends a registration request to a sensor network controller, wherein the registration request comprises the identifier of the sensor network.

Then, the sensor network controller receives registration information from various sensor network gateways as governed by the sensor network controller, wherein the registration information comprises identifiers of various sensor networks governed by various sensor network gateways.

The sensor network controller establishes a binding cache entry based on the registration information, wherein the binding cache entry comprises correspondence relationship between the address of a corresponding sensor network gateway and an identifier of a corresponding sensor network as governed by the corresponding sensor network gateway.

Load Balance Process

Hereinafter, a load balance process will be explained. During the load balance process, the sensor network may preferably utilize a plurality of access manners to access to the Internet. Hereinafter, with reference to FIG. 2, the load balance process will be described in detail.

Figures 2, 3:
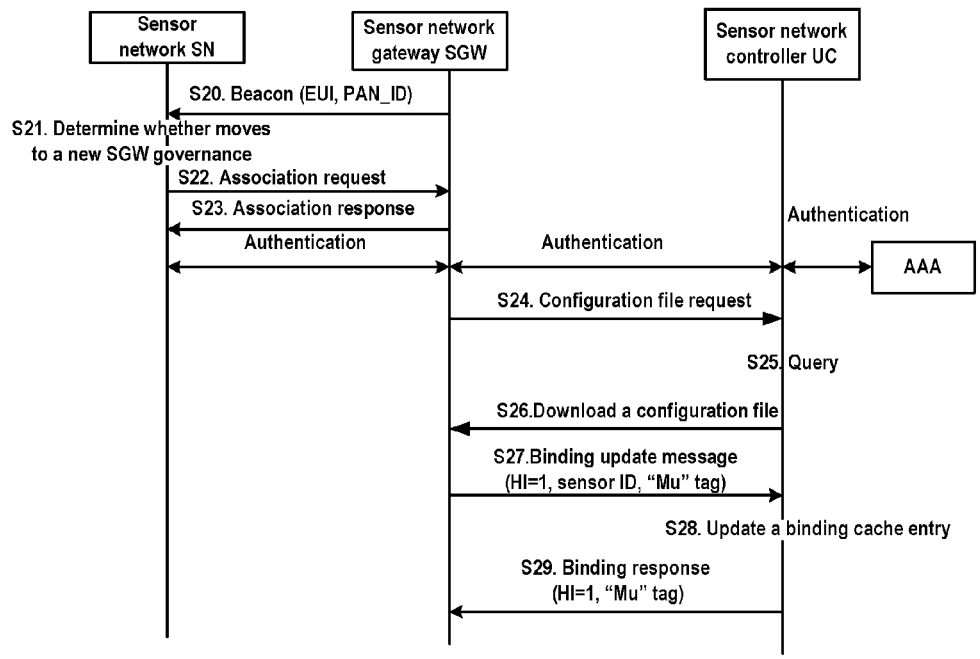
FIG. 2 shows a flow chart of a systematic method according to one embodiment of the present invention.
FIG. 3 shows a binding cache entry according to one embodiment of the present invention.

FIG. 2 shows a flow chart of a systematic method according to one embodiment of the present invention.

First, in step S20, the sensor network gateway sends a beacon to the sensor network. The beacon comprises an EUI and a PAN_ID of the sensor network gateway.

Then, in step S21, the sensor network determines whether the sensor network moves to an area governed by a new SGW based on the EUI and PAN_ID in the beacon that is sent from the SGW.

Specifically, the sensor network performs mobility check by comparing the PAN_IDs in the beacons sent from the new SGW and the old SGW. If the PAN_ID in the beacon from the new SGW is identical to the PAN_ID in the beacon from the old SGW, then the sensor network SN knows that it still moves within the same SGW. If the PAN _ID in the beacon from the new SGW is different from the PAN_ID in the beacon from the old SGW, then the sensor network SN knows that it moves into the new SGW.

If the sensor network wishes connecting to the new SGW, then in step S22, the sensor network sends an association request to the new SGW. The association request includes a notification to the SGW that the sensor network is new to the PAN and the sensor network wishes being associated with the PAN. The association request further comprises an identifier of the sensor network (sensor ID).

Next, in step S23, after receiving the association request from the sensor network, the SGW sends an association response to the sensor network.

Then, with the assistance of the new SGW and UC, an authentication, authorization, and accounting server (3A server) performs authentication with the sensor network. Because the present invention does not involve authentication, it will not be detailed here. Further, FIG. 2 does not show the 3A server.

Then, after a successful authentication, the SGW will download a configuration file from the UC. Specifically, first, at step S24, the SGW sends a configuration request to the UC.

Then, after the UC receives the configuration request from the sensor network gateway, in step S25, the UC queries a pre-configured local database based on the configuration request so as to determine whether the sensor network supports multi-homing.

Then, in step S26, the UC sends the configuration file to the sensor network gateway, the configuration file being for indicating that the sensor network supports multi-homing. Of course, if the UC finds that the sensor network does not support multi-homing through querying the local database, then in step S26, the configuration file sent by the UC to the sensor network gateway indicates that the sensor network does not support multi-homing. Of course, considering that the number of sensor networks accessed by the SGW might not be one, the network gateway configuration file should further include the identifier of the sensor network.

Then, if the sensor network supports multi-homing, in step S27, the SGW sends a binding update message to the UC, the binding update message for example is sent in an IPv6 data packet, wherein the IPv6 source address in the header of the IPv6 data packet is the IPv6 address of the new SGW. In the binding update message, a Mu tag is set to 1, and the HI value in a mobile option field is also set to 1. The mobile option field in the binding update message further comprises the identifier of the sensor network. FIG. 4 shows an exemplary format of a binding update message. Compared with the traditional binding update message as defined in traditional PMIPv6, the exemplary binding update message in the present invention introduces an MU tag which is specifically designed for load balance of a ubiquitous sensor network.

Then, after the UC receives the binding update message from the SGW, in step S28, the UC updates the binding cache entry to assign a new mobile session to the new interface. In the binding cache entry, the original SGW is tagged as M (master), and the newly added SGW is tagged as S (slavery). Referring to FIG. 3, FIG. 3 shows an exemplary format of a binding cache entry.

Then, in step S29, the UC returns a binding confirmation message to the new SGW, i.e., a binding update confirmation message. In the binding confirmation message, the Mu is set as 1, and the value of the HI in the mobile option field is set as 1. The exemplary format of the binding confirmation message as provided in the present invention is shown in FIG. 5. Compared with the traditional binding confirmation message as defined in traditional PMIPv6, the exemplary binding confirmation message in the present invention newly introduces an MU tag which is specifically designed for load balance of a ubiquitous sensor network.

The above has depicted the embodiments of the present invention. However, the present invention is not limited to a specific system, apparatus, or a specific protocol. Those skilled in the art may make various transformations or amendments within the scope of the appended claims.

A person of normal skill in the art may understand and implement other variations of the disclosed embodiments through studying the description, the disclosed content, the drawings, and the appended claims. In the claims, the wording "comprise" does not exclude other elements and steps, and the wording "a" or "an" does not exclude plurality. In the present invention, "first" and "second" merely indicate a name, instead of representing a sequential relationship. In actual applications of the present invention, a spare part may perform the functions of a plurality of technical features as recited in the claims. Any reference sign in the claims should not be understood as a limitation to the scope.

What is claimed is:

1. A method of supporting sensor network multi-homing in a sensor network gateway, comprising:
    sending a configuration request to a sensor network controller, wherein the configuration request comprises a query as to whether a sensor network governed by the sensor network gateway supports multi-homing;
    receiving a configuration file from the sensor network controller, wherein the configuration file comprises an indicator that indicates whether the sensor network supports multi-homing;
    when the sensor network supports multi-homing, sending a binding update message to the sensor network controller, wherein the binding update message comprises an identifier of the sensor network and an indicator for indicating that the sensor network supports multi-homing.

2. The method according to claim 1, wherein when the sensor network hands off, the binding update message further comprises a handoff indicator, wherein value of the handoff indicator is 1.

3. The method according to claim 1, wherein before sending a configuration request to a sensor network controller, the method further comprises:
    sending a beacon to the sensor network, the beacon comprising an Extended Unique Identifier of the sensor network gateway and a Personal Area Network Identifier of the sensor network gateway;
    receiving an association request from the sensor network, the association request comprising an identifier of the sensor network;
    sending an association response based on the association request from the sensor network.

4. A method for processing location information of a sensor network in a sensor network controller, comprising:
    receiving a configuration request from a sensor network gateway;
    querying a pre-configured local database based on the configuration request so as to determine whether the sensor network supports multi-homing;
    sending a configuration file to the sensor network gateway, wherein the configuration file comprises an indicator that indicates whether the sensor network supports multi-homing.

5. The method according to claim 4, wherein after sending a configuration file to the sensor network gateway, the method further comprises:
    sending a response message to the sensor network gateway, the response message comprising an indicator for indicating that the sensor network supports multi-homing and a handoff indicator, wherein the handoff indicator has a value of 1.

6. The method according to claim 4, wherein after sending a configuration file to the sensor network gateway, the method further comprises:
    receiving a binding update message from the sensor network gateway, wherein the binding update message comprises an identifier of the sensor network and an indicator for indicating that the sensor network supports multi-homing;
    updating a binding cache entry based on the binding update message.

7. The method according to claim 6, wherein when the sensor network supports multi-homing, the binding cache entry further comprises information indicating whether the sensor network gateway is a master gateway or a slavery gateway.

8. The method according to claim 4, wherein before receiving a configuration request from a sensor network gateway, the method further comprises:
    receiving registration information from each sensor network gateway governed by the sensor network controller, wherein the registration information comprises an identifier of each sensor network as governed by the each sensor network gateway;
    establishing a binding cache entry based on the registration information, wherein the binding cache entry comprises correspondence relationship between an addresses of a corresponding sensor network gateway and the identifier of a corresponding sensor network as governed by the corresponding sensor network gateway.

* * * * *